(12) United States Patent
Gomyo et al.

(10) Patent No.: US 6,834,996 B2
(45) Date of Patent: Dec. 28, 2004

(54) MOTOR WITH DYNAMIC PRESSURE BEARING

(75) Inventors: Masato Gomyo, Nagano (JP); Shingo Suginobu, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 40 days.

(21) Appl. No.: 10/436,897

(22) Filed: May 13, 2003

(65) Prior Publication Data

US 2004/0028300 A1 Feb. 12, 2004

(30) Foreign Application Priority Data

May 24, 2002 (JP) ....................... 2002-151311
May 15, 2002 (JP) ....................... 2002-139584

(51) Int. Cl.[7] ............................. F16C 32/06
(52) U.S. Cl. ................. 384/100; 384/107; 384/112
(58) Field of Search ......................... 384/100, 107, 384/112, 114; 360/99.08, 98

(56) References Cited

U.S. PATENT DOCUMENTS 5,647,672 A * 7/1997 Fukutani ............... 384/114
5,723,927 A * 3/1998 Teshima ............... 384/100
6,469,866 B1 * 10/2002 Nii et al. ............... 384/112

FOREIGN PATENT DOCUMENTS

| JP | 2000-134881 | 5/2000 |
| JP | 2001-065552 | 3/2001 |
| JP | 2001-178074 | 6/2001 |

* cited by examiner

Primary Examiner—Thomas R. Hannon
(74) Attorney, Agent, or Firm—Hagan & Hartson, LLP

(57) ABSTRACT

A dynamic pressure bearing motor includes a rotary shaft, a rotary hub coupled to the rotary shaft, a dynamic pressure bearing sleeve that supports the rotary shaft by dynamic pressure and has a fallout stopper flange section that protrudes outward in the radial direction, a thrust dynamic pressure bearing section formed in an axial direction between the dynamic pressure bearing sleeve and the rotary hub, and a circular ring-shaped member that surrounds an outer circumference surface of the dynamic pressure bearing sleeve. The circular ring-shaped member has a hub mounting section that connects to an end surface of the rotary hub in a region radially outside the thrust dynamic pressure bearing section, and a main body section that protrudes inward from the hub mounting section. An inner circumference surface of the hub mounting section of the circular ring-shaped member opposes in the radial direction an outer circumference surface of the fallout stopper flange section of the dynamic pressure bearing sleeve, and the main body section of the circular ring-shaped member opposes in the axial direction the fallout stopper flange section of the dynamic pressure bearing sleeve to prevent the dynamic pressure bearing sleeve from falling out in the axial direction.

26 Claims, 10 Drawing Sheets

MOTOR WITH DYNAMIC PRESSURE BEARING

BACKGROUND OF THE INVENTION

1. Field of the Invention

The present invention relates to a motor with dynamic pressure bearing that is equipped with a dynamic pressure bearing member that supports a rotary shaft by utilizing dynamic pressure generated in a lubricating fluid.

2. Related Background Art

In recent years, development of dynamic pressure bearing motors, in which a dynamic pressure bearing member or dynamic pressure bearing sleeve supports a rotary shaft by utilizing dynamic pressure generated in lubricating fluid, has been in progress for bearing apparatuses that allow rotating bodies to rotate at high-speed and with high precision to be used in various rotatively driven apparatuses. An effort is underway to make the entire apparatus thinner for such dynamic pressure bearing motors, and forming a thrust bearing section by utilizing an end surface in the axial direction of a dynamic pressure bearing sleeve has been proposed in order to achieve such thinner apparatus.

In such dynamic pressure bearing motors, a dynamic pressure bearing sleeve is inserted through and fixed to the inner side of a generally cylindrical holder member that holds a stator core, and a rotary hub is mounted on a rotary shaft that is supported in a freely rotatable manner by the dynamic pressure bearing sleeve. A bottom end surface at the center part of the rotary hub opposes in close proximity a top end surface of the dynamic pressure bearing sleeve, thereby forming a thrust dynamic pressure bearing section.

A lubricating fluid is filled in the thrust dynamic pressure bearing section, and dynamic pressure generating grooves in herringbone shape, for example, are concavely formed as a dynamic pressure generating means for the lubricating fluid, such that the pressurizing effect of the dynamic pressure generating grooves generates dynamic pressure in the lubricating fluid.

A fluid sealing section is formed on the outer side than and adjacent to the thrust dynamic pressure bearing section, which is made of a capillary sealing section and serves to prevent the lubricating fluid inside the thrust dynamic pressure bearing section from flowing outside. The fluid sealing section is formed by taking advantage of the outer circumference surface of the dynamic pressure bearing sleeve, for example, and is formed between the outer circumference surface of the dynamic pressure bearing sleeve and the inner circumference surface of a circular ring-shaped member mounted on the rotary hub.

A magnetic disk that is rotated by the dynamic pressure bearing motor is made of aluminum alloy, glass or resin. The material of the hub on which the magnetic disk is mounted and which rotates in a unitary fashion with the magnetic disk is selected to have a thermal expansion coefficient virtually equivalent to that of the magnetic disk material. This is to prevent the disk from warping as a result of temperature changes. Normally, aluminum alloy hubs are used with aluminum alloy disks, and ferrite stainless steel hubs are used with glass disks.

In general, aluminum alloy disks are cheaper than glass disks. However, an aluminum alloy hub that fits to an aluminum alloy disk is relatively soft and the mechanical strength obtained when the hub is joined with a rotary shaft is not sufficient; this consequently requires some structural ingenuity. To enhance the mechanical strength, a motor may be equipped with a hard coupling member that is placed between the inner circumference side of an aluminum alloy hub and the outer circumference side of a rotary shaft such that the hub and the rotary shaft are joined in a unitary structure.

As described above, when forming a thrust bearing section by utilizing a top end surface of a dynamic pressure bearing sleeve, a circular ring-shaped member that serves as a fallout stopper member is positioned to project out to the position of a holder member that holds a stator core; this inevitably causes the holder member to be shortened by that much in the axial direction. This results in a shorter joining length between the holder member and the stator core, which causes the holding strength of the stator core to be reduced, which in turn leads to larger electromagnetic vibration of the stator core.

Furthermore, since the joining length in the axial direction of the circular ring-shaped member would also be insufficient, the joining strength of the circular ring-shaped member would lend to be insufficient; and dust from adhesive in a joining section of the circular ring-shaped member could enter a sealing section positioned in the vicinity of the circular ring-shaped member and cause contamination.

In the meantime, a motor apparatus may be designed such that a holder member's length in the axial direction is lengthened to match that of a stator core. However, by doing so, a circular ring-shaped member that serves as a fallout stopper member for a rotary hub cannot be mounted because of the holder member, and this leaves no choice but to provide the fallout stopper member parallel in the axial direction to a radial bearing section. This causes the radial bearing section's span in the axial direction to be shortened and the bearing rigidity to decline, and the motor's height in the axial direction would have to be lengthened in order to obtain sufficient bearing rigidity for the radial bearing section.

In conventional dynamic pressure bearing motors, copper alloys such as phosphor bronze or iron alloys such as ferrite stainless steel are used as the material for a sleeve that serves as a dynamic pressure bearing member. When using an aluminum alloy disk, it is preferable to use aluminum alloy also as the material for a rotary hub. However, using aluminum alloy as the material for the rotary hub that makes up a thrust bearing does not provide sufficient hardness; consequently, the rotary hub that makes up the thrust bearing comes into contact with an end surface of a sleeve, which serves as a dynamic pressure bearing member, whenever there is a start or stop operation, which causes the rotary hub to wear quickly and the dynamic pressure bearing to have a short life.

SUMMARY OF THE INVENTION

The present invention relates to a dynamic pressure bearing motor in which a fallout stopper member for a rotary hub can be firmly fixed in a space-saving manner, using a simple structure.

The present invention also relates to a dynamic pressure bearing motor in which the wear on a rotary hub can be controlled and the service life of a dynamic pressure bearing extended even when a rotating member made of an aluminum material comes into contact with a dynamic pressure bearing member in start and stop operations.

In accordance with one embodiment of the present invention, a dynamic pressure bearing motor is equipped with a dynamic pressure bearing sleeve for supporting a rotary shaft by a dynamic pressure; a rotary hub coupled to the rotary shaft; a thrust dynamic pressure bearing section formed between the dynamic pressure bearing sleeve and the rotary hub; and a circular ring-shaped member that is placed to surround an outer circumference surface of the dynamic pressure bearing sleeve, and has a hub mounting section joined to an end surface of the rotary hub in a region radially outside of the thrust dynamic pressure bearing section and a main body section that inwardly protrudes from the hub mounting section. A fluid sealing section that prevents a lubricating fluid inside the thrust dynamic pressure bearing section from flowing outside is formed between the hub mounting section and an outer circumference surface of the dynamic pressure bearing sleeve, wherein the fluid sealing section is defined by a gap in the radial direction formed continuously from the thrust dynamic pressure bearing section. The dynamic pressure bearing sleeve includes a fallout stopper flange section that protrudes outward in the radial direction and opposes in the axial direction the main body section of the circular ring-shaped member to prevent the circular ring-shaped member from falling out in the axial direction. The inner circumference surface of the hub mounting section is positioned to oppose in the radial direction the outer circumference surface of the fallout stopper flange section of the dynamic pressure bearing sleeve.

According to the dynamic pressure bearing motor having such a structure, due to the fact that the hub mounting section of the circular ring-shaped member is positioned on the outer circumference side of the fallout stopper flange section provided on the dynamic pressure bearing sleeve, the hub mounting section of the circular ring-shaped member does not spatially interfere with a holder member that extends in the axial direction to hold a stator core. As a result, the height in the axial direction of a stator core holding section of the holder member can be extended to reach the hub mounting section of the circular ring-shaped member. As a result, the stator core is joined to the holder member with a sufficient joining force, which favorably controls the magnetic vibration of the stator core.

Especially by forming the height in the axial direction of the stator core holding section of the holder member to be equivalent to the height in the axial direction of the stator core held by the holder member in the dynamic pressure bearing motor, the joining force of the stator core can be obtained sufficiently and as required.

In one aspect of the present embodiment, the rotary hub may be provided with a fixing section that protrudes in the axial direction from an end surface in the axial direction of the rotary hub, which fixes the hub mounting section of the circular ring-shaped member through plastic deformation. The inner circumference surface of the fixing section may be formed as a regulating surface that positions the hub mounting section of the circular ring-shaped member. As a result, the hub mounting section can be readily mounted on the rotary hub with high precision due to the positioning regulating surface of the fixing section; and this results in a firmly fixed state between the hub mounting section and the rotary hub through the plastic deformation of the fixing section.

The dynamic pressure bearing motor may be further provided with a circumferential wall section that collects a coating sealer for the plastically deformed fixing section formed on the rotary hub outer side in the radial direction of the fixing section. As a result, contamination that may be caused by plastically deforming the fixing section can be favorably prevented and the lubricating fluid can be favorably prevented from flowing outside the fixing section by the coating sealer.

In the dynamic pressure bearing motor, the fluid sealing section may have a capillary sealing structure whose gap dimension gradually enlarges towards an opening of the fluid sealing section, and both of the outer circumference surface of the dynamic pressure bearing sleeve and the inner circumference surface of the main body section of the circular ring-shaped member, which together form the fluid sealing section, may have a tapered surface that slopes inward in the radial direction towards the opening of the fluid sealing section, such that the center axial line of the fluid sealing section slopes inward in the radial direction towards the opening. As a result, the centrifugal force during rotation, in addition to the inherent capillary sealing effect of the fluid sealing section, works to push inward the lubricating fluid inside the fluid sealing section, which results in an substantially favorable sealing effect.

In accordance with another embodiment of the present invention, a dynamic pressure bearing motor is equipped with a dynamic pressure bearing member for supporting a rotary shaft by dynamic pressure; a rotary member that rotates with the rotary shaft in a unitary fashion; a thrust dynamic pressure bearing section formed between the dynamic pressure bearing member and the rotary member; and a circular ring-shaped member having a mounting section that surrounds an outer circumference surface of the dynamic pressure bearing member and a main body section that protrudes radially inward from the mounting section, wherein the mounting section is joined to an end surface of the rotary member in a region radially outer side of the thrust dynamic pressure bearing section. The dynamic pressure bearing member includes a fallout stopper flange section that protrudes outward in the radial direction and opposes in the axial direction the main body section of the circular ring-shaped member. The main body section of the circular ring-shaped member overlaps the fallout stopper flange section to prevent the dynamic pressure bearing member from falling out in the axial direction.

The inner circumference surface of the mounting section of the circular ring-shaped member is positioned to oppose on the outer side in the radial direction the outer circumference surface of the fallout stopper flange section of the dynamic pressure bearing member. The dynamic pressure bearing motor also includes a stator core holding section that is provided to oppose in the axial direction the mounting section of the circular ring-shaped member and oppose in the radial direction the main body section of the circular ring-shaped section.

As a result, the length of a holder member that holds a stator core can be sufficiently extended in the axial direction, and the height in the axial direction of the stator core holding section of the holder member can be extended to a position in the vicinity of the hub mounting section of the circular ring-shaped member. This results in sufficient joining force for the stator core and in a favorable control of the magnetic vibration of the stator core.

In accordance with another embodiment of the present invention, a dynamic pressure bearing motor is equipped with a rotating member that is rotatively driven in a unitary fashion with a rotary shaft; a dynamic pressure bearing member that rotatively supports the rotary shaft by dynamic pressure; and a thrust dynamic pressure bearing provided in a region where an end surface in the axial direction of the dynamic pressure bearing member and an end surface in the axial direction of the rotating member oppose each other in the axial direction. The rotating member includes a rotary hub that is made of an aluminum material and has a disk mounting section, and a thrust plate that is provided on the rotary hub and is made of an iron material and makes up a part of the thrust dynamic pressure bearing. As a result, wear on the rotary hub is controlled and the life of the dynamic pressure bearing can be extended, even when the hub and the dynamic pressure bearing member come into contact in start and stop operations.

In one aspect of the present invention, the dynamic pressure bearing member may have an expanded diameter section, in which the diameter of an end section in the axial direction of the dynamic pressure bearing is expanded outward in the radial direction, and the thrust dynamic pressure bearing section can be formed in a region where the end surface on the expanded diameter section side of the dynamic pressure bearing member and the thrust plate oppose each other in the axial direction.

In another aspect of the present invention, the expanded diameter section of the dynamic pressure bearing member may preferably be interposed between the circular ring-shaped member and the rotating member, in order to prevent the dynamic pressure bearing member from falling out the rotating member, and vice versa.

In another aspect of the present invention, the circular ring-shaped member may preferably be positioned in the axial direction by abutting itself against the thrust plate provided on the rotating member. By having the circular ring-shaped member abut against the thrust plate, the gap at the thrust dynamic pressure bearing section in the thrust direction stabilizes and the fluctuation in the dynamic pressure force in the thrust direction can be reduced.

In another aspect of the present invention, the rotary shaft can be fitted in a unitary fashion on the inner circumference side of the thrust plate and the rotating member can be mounted in a unitary fashion on the outer circumference side of the thrust plate. With such a structure, the bonding strength between the hub made of an aluminum material and the rotary shaft can be increased.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Embodiments of the present invention are described in detail below with reference to the accompanying drawings. First, an overview of a hard disk drive device (HDD) as one example employing a dynamic pressure bearing motor in accordance with an embodiment of the present invention is described.

Figure 1:
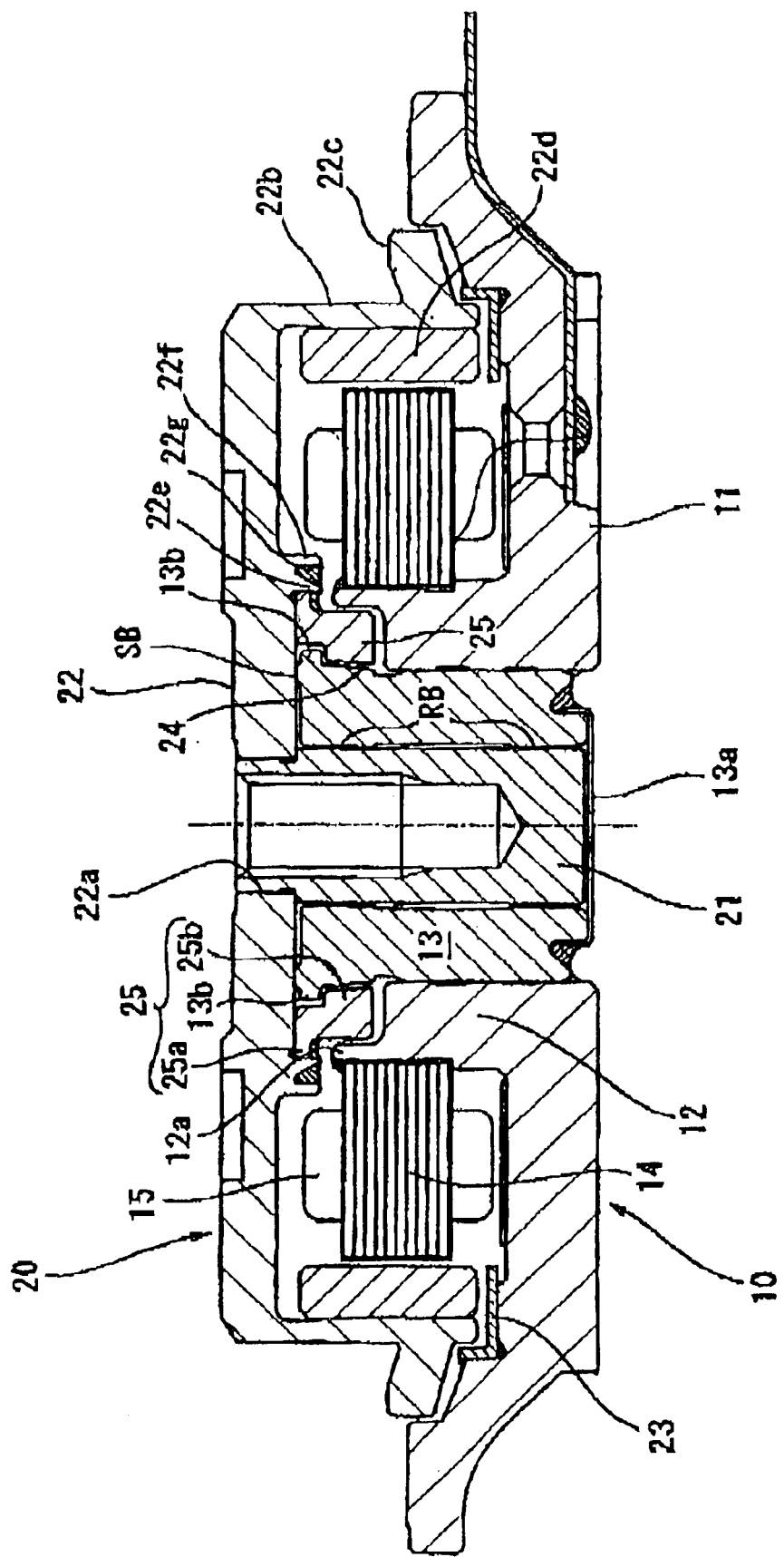
FIG. 1 is a longitudinal cross-sectional view of an overview of a shaft rotation-type HDD spindle motor with a dynamic pressure bearing in accordance with an embodiment of the present invention.

The entire shaft rotation-type HDD motor shown in FIG. 1 is formed from a stator assembly 10, which is a fixed member, and a rotor assembly 20, which is a rotating member assembled onto the top of the stator assembly 10. The stator assembly 10 has a fixed frame 11 screwed to a fixed base, not shown. The fixed frame 11 is formed with an aluminum material to achieve a lighter weight, and includes a ring-shaped bearing holder 12 formed upright in the generally center part thereof. On an inner circumference surface of the ring-shaped bearing holder 12 is provided a dynamic pressure bearing sleeve 13, which is a fixed bearing member formed in the shape of a hollow cylinder and joined to the bearing holder 12 through press fit or shrink fit. The dynamic pressure bearing sleeve 13 is formed with a copper material such as phosphor bronze in order to more easily machine holes with small diameter.

A stator core 14 having a stacked layer of electromagnetic steel plates is mounted on the bearing holder 12. More specifically, the inner circumference side of the stator core 14 is mounted on a mounting surface on the outer circumference side of the bearing holder 12. A plurality of salient pole sections radially extend on the stator core 14, and a drive coil 15 is wound around each of the salient pole sections on the stator core 14.

A part on the outer circumference side of the bearing holder 12 that holds the stator core 14, i.e. a stator core mounting section 12*a* that includes the mounting surface for the stator core 14, is lengthened and/or expanded in the axial direction to extend virtually the entire length of the height in the axial direction of the inner circumference surface of the stator core 14.

A rotary shaft 21, which makes up the rotor assembly 20, is inserted in a freely rotatable manner in a center hole provided in the dynamic pressure bearing sleeve 13. A dynamic pressure surface formed on the inner circumference surface of the dynamic pressure bearing sleeve 13 is positioned opposite in the radial direction a dynamic pressure surface formed on the outer circumference surface of the rotary shaft 21, such that radial dynamic pressure bearing sections RB, RB are formed in a minuscule gap section between the two dynamic pressure surfaces, which are separated from each other by an appropriate distance in the axial direction. More specifically, the dynamic pressure surface on the dynamic pressure bearing sleeve 13 side and the dynamic pressure surface on the rotary shaft 21 side of each of the radial dynamic pressure bearing sections RB are positioned opposite each other in a circular fashion across a minuscule gap of several micrometers, and a lubricating fluid (not shown) such as lubricating oil or magnetic fluid is filled or present in a continuous manner in the axial direction in a bearing space formed by the minuscule gap.

Radial dynamic pressure generating grooves in herringbone shape (see G in FIG. 3), for example, that are concavely formed in a ring shape in two blocks separated in the axial direction, are formed on at least one of the dynamic pressure surfaces of the dynamic pressure bearing sleeve 13 and the rotary shaft 21. During rotation the pumping effect of the radial dynamic pressure generating grooves pressurizes the lubricating fluid to generate dynamic pressure, and a rotary hub 22 together with the rotary shaft 21 becomes shaft-supported in a non-contact state in the radial direction with the dynamic pressure bearing sleeve 13 due to the dynamic pressure of the lubricating fluid.

The rotary hub 22, which is a rotating member that with the rotary shaft 21 makes up the rotor assembly 20, is a generally cup-shaped member made of an aluminum metal, and a joining hole 22a provided in the center part of the rotary hub 22 is joined in a unitary fashion with the top end part of the rotary shaft 21 through press fit or shrink fit. The rotary hub 22 is provided with a generally cylindrically-shaped body section 22b, which has a recording medium disk such as a magnetic disk, not shown, mounted on its outer circumference section, as well as with a disk mounting section 22c that projects outward in the radial direction from the body section 22b and supports the recording medium disk in the axial direction, where the recording medium disk is fixed by a clamper (not shown) placed and screwed from above.

A ring-shaped drive magnet 22d is mounted on the inner circumference surface of the body section 22b of the rotary hub 22. The ring-shaped drive magnet 22d is positioned in such a way that its inner circumference surface is placed to oppose in a ring-shaped manner and in close proximity the outer circumference end surface of each of the salient pole sections of the stator core 14, and the bottom end surface of the ring-shaped drive magnet 22d is positioned opposite in the axial direction a magnetic attraction plate 23 mounted on the fixed frame 11; the magnetic attractive force between the members 22d and 23 causes the entire rotary hub 22 to be attracted in the axial direction, which results in a stable rotating state.

In the meantime, an opening section provided at the bottom end side of the dynamic pressure bearing sleeve 13 is closed off by a cover 13a, and this prevents the lubricating fluid inside each of the radial dynamic pressure bearing sections RB from leaking outside.

The top end surface of the dynamic pressure bearing sleeve 13 and the bottom end surface at the center part of the rotary hub 22 are opposite each other in close proximity in the axial direction, and a thrust dynamic pressure bearing section SB is provided in a region where the top end surface of the dynamic pressure bearing sleeve 13 and the bottom end surface of the rotary hub 22 oppose each other in the axial direction. In other words, on at least one of the opposing dynamic pressure surfaces of the members 13 and 22 that make up the thrust dynamic pressure bearing section SB, thrust dynamic pressure generating grooves (not shown) in herringbone shape, for example, are formed, and the parts that oppose each other in the axial direction, including the thrust dynamic pressure generating grooves, form the thrust dynamic pressure bearing section SB.

The dynamic pressure surface on the top end surface of the dynamic pressure bearing sleeve 13 and the dynamic pressure surface on the bottom end surface of the rotary hub 22, which oppose each other in close proximity and together make up the thrust dynamic pressure bearing section SB, are positioned opposite each other in the axial direction across a minuscule gap of several micrometers, and the lubricating fluid is continuously filled from the radial dynamic pressure bearing sections RB into the bearing space consisting of the minuscule gap. During rotation, the pumping effect of the thrust dynamic pressure generating grooves pressurizes the lubricating fluid to generate dynamic pressure, and the rotary shaft 21 and the rotary hub 22 become shaft-supported in the thrust direction in a floating, non-contact state due to the dynamic pressure of the lubricating fluid.

A fluid sealing section, which consists of a capillary sealing section 24, is formed on the outer circumference wall surface of the dynamic pressure bearing sleeve 13. The capillary sealing section 24 that serves as the fluid sealing section is formed on the outer side in the radial direction and adjacent to the thrust opposing region, including the thrust dynamic pressure bearing section SB, in the axial direction such that the capillary sealing section 24 is formed by the outer circumference surface of the dynamic pressure bearing sleeve 13 and the inner circumference surface of a circular ring-shaped member 25, which serves as a fallout stopper member formed opposite the outer circumference wall surface of the dynamic pressure bearing sleeve 13 in the radial direction.

The circular ring-shaped member 25 is made from a generally ring-shaped member, and includes a plate-shaped hub mounting section 25a that forms an outer circumference part of the circular ring-shaped member 25 and is fixed by a fixing section 22e provided on the rotary hub 22. The circular ring-shaped member 25 also includes a main body section 25b that protrudes inward in the radial direction from the hub mounting section 25a; in other words, the hub mounting section 25a of the circular ring-shaped member 25 recedes in the radial direction with respect to the main body section 25b.

The inner circumference surface of the main body section 25b, which protrudes inward from the hub mounting section 25a, is positioned to form with the outer circumference surface of the dynamic pressure bearing sleeve 13 a gap in the radial direction that is continuous from the thrust dynamic pressure bearing section SB; and the gap in the radial direction forms the fluid sealing section 24 that prevents the lubricating fluid inside the thrust dynamic pressure bearing section SB from flowing outside.

The gap between the inner circumference surface of the circular ring-shaped member 25 and the outer circumference surface of the dynamic pressure bearing sleeve 13 that together form the capillary sealing section 24, which serves as the fluid sealing section, is formed to continuously expand towards an opening at the bottom of FIG. 1, such that the gap forms a tapered sealing space. The lubricating fluid inside the thrust dynamic pressure bearing section SB is continuously filled to reach the capillary sealing section 24, and the liquid level of the lubricating fluid is positioned at all times at some point in the capillary sealing section 24. Both the outer circumference surface of the dynamic pressure bearing sleeve 13 and the inner circumference surface of the main body section 25b of the circular ring-shaped member 25, which together form the capillary sealing section 24, are formed as a tapered surface that slopes inward in the radial direction towards the opening side (towards the bottom in FIG. 1) of the capillary sealing section 24, such that the center axial line of the capillary sealing section 24 slopes inward in the radial direction towards the opening side. As a result, the centrifugal force during rotation, in addition to the inherent capillary sealing effect, works to push the lubricating fluid inside the capillary sealing section 24 towards the outer circumference, or inward (towards the top in FIG. 1).

In the meantime, the fixing section 22e is formed on the bottom end surface of the rotary hub 22 to protrude in the axial direction (downward in FIG. 1) in a region on the outer side in the radial direction than the thrust dynamic pressure bearing section SB. The fixing section 22e covers the hub mounting section 25a of the circular ring-shaped member 25 from the outer side and is rendered plastic deformation through caulking or the like, and the plastic deformation of the fixing section 22e causes the hub mounting section 25a, which is the mounting section of the circular ring-shaped member 25, to be firmly fixed to the rotating member.

The inner circumference surface of the fixing section 22e is formed as a regulating surface that positions and guides the hub mounting section 25a of the circular ring-shaped member 25 to a predetermined position, such that by mounting the hub mounting section 25a of the circular ring-shaped member 25 as it is slid in the axial direction along the positioning regulating surface of the fixing section 22e, the entire circular ring-shaped member 25 is mounted easily and with high precision.

A flange-shaped circumferential wall section 22f is provided in an upright manner on the outer side in the radial direction than the fixing section 22e provided on the rotary hub 22. A coating sealer 22g is coated from the outside of the plastically deformed fixing section 22e to cover the fixing section 22e, and the coating sealer 22g is collected in a space on the inner side of the circumferential wall section 22f.

A fallout stopper flange section 13b that protrudes to project outward in the radial direction and is formed as an expanded diameter section is provided at the top end part of the dynamic pressure bearing sleeve 13; one part of the fallout stopper flange section 13b is positioned to be opposite the top surface of the main body section 25b of the circular ring-shaped member 25 in the axial direction. By having the members 13b and 25b positioned in an abuttable manner in the axial direction, the rotary hub 22 is prevented from falling out in the axial direction.

In other words, the hub mounting section 25a of the circular ring-shaped member 25 is positioned on the outer side in the radial direction than the fallout stopper flange section 13b of the dynamic pressure bearing sleeve 13, such that the inner circumference surface of the hub mounting section 25a of the circular ring-shaped member 25 is positioned on the outer side in the radial direction opposite the outer circumference surface of the fallout stopper flange section 13b.

Due to the fact that the hub mounting section 25a of the circular ring-shaped member 25 is positioned on the outer circumference side of the fallout stopper flange section 13b provided on the dynamic pressure bearing sleeve 13 according to the present embodiment, a space in which the main body section 25b of the circular ring-shaped member 25 does not exist is formed above the bearing holder 12 that holds the stator core 14; this allows the space to be used to expand the height of the bearing holder 12 in the axial direction to reach the hub mounting section 25a of the circular ring-shaped member 25. In other words, the stator core holding section 12a that includes the outer circumference mounting surface of the bearing holder 12, which holds the stator core 14, is expanded in the axial direction along virtually the entire length of the inner circumference side surface of the stator core 14 in the axial direction; and this causes the joining force of the stator core 14 to be sufficient and the magnetic vibration of the stator core 14 to be favorably controlled.

Due especially to the fact that the height in the axial direction of the stator core holding section 25a of the bearing holder 12 is formed to be equal to or greater than the height in the axial direction of the stator core 14 held by the bearing holder 12 according to the present embodiment, the joining force of the stator core 14 can be obtained sufficiently and as required.

Figure 2:
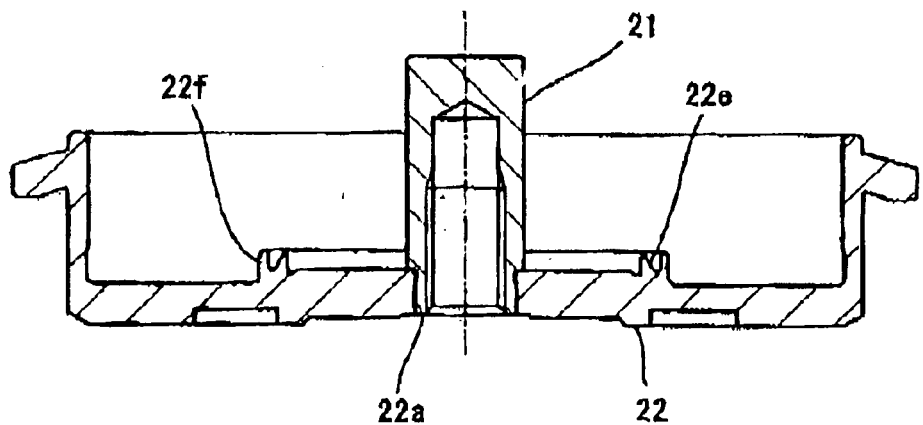
FIG. 2 is a longitudinal cross-sectional view of a rotary shaft fixed to a rotary hub used in the HDD spindle motor shown in FIG. 1.
Figure 3:
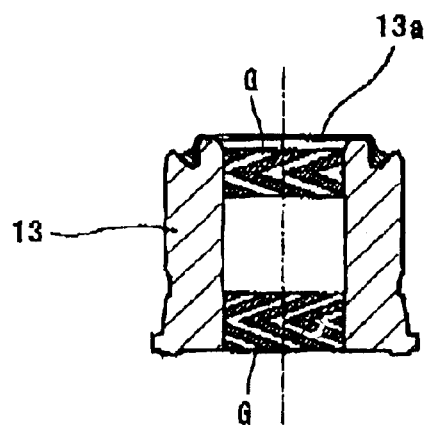
FIG. 3 is a longitudinal cross-sectional view of a dynamic pressure bearing sleeve used in the HDD spindle motor shown in FIG. 1.
Figure 4:
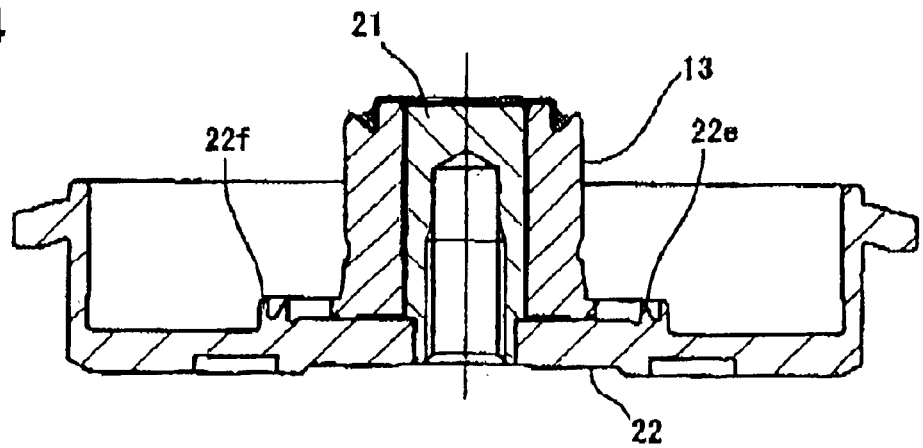
FIG. 4 is a longitudinal cross-sectional view of the dynamic pressure bearing sleeve in FIG. 3 mounted on the rotary shaft fixed to the rotary hub in FIG. 2.
Figure 5:
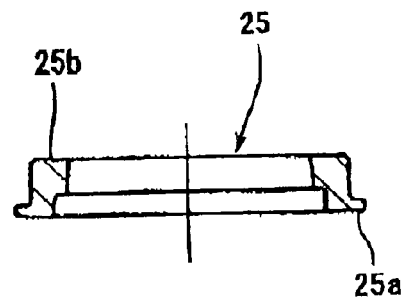
FIG. 5 is a longitudinal cross-sectional view of a circular ring-shaped member used in the HDD spindle motor shown in FIG. 1.
Figure 6:
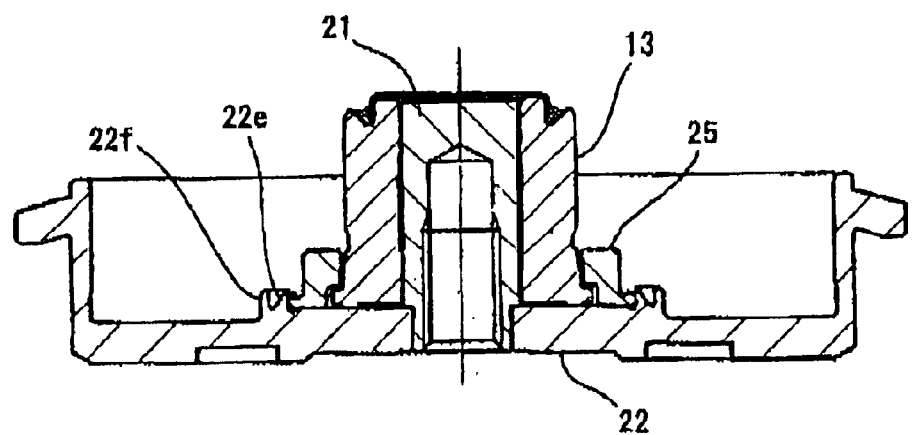
FIG. 6 is a longitudinal cross-sectional view of the circular ring-shaped member in FIG. 5 mounted on the dynamic pressure bearing sleeve mounted on the rotary shaft in FIG. 4.
Figure 7:
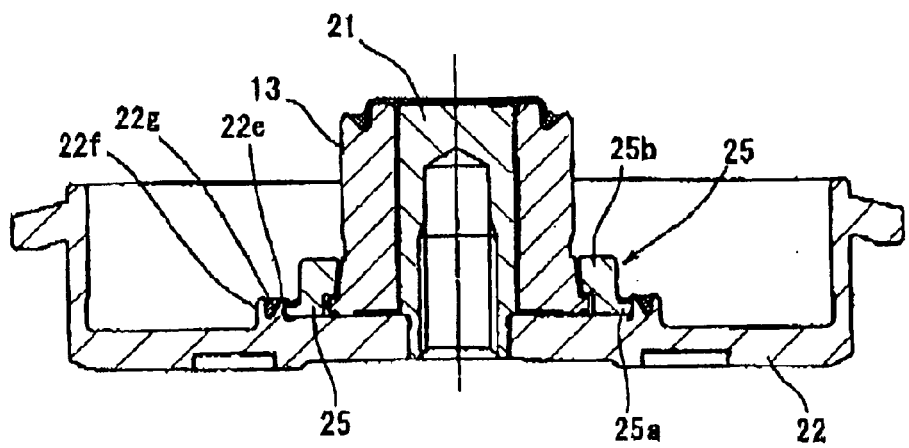
FIG. 7 is a longitudinal cross-sectional view of the circular ring-shaped member in FIG. 6 fixed.

Next, a procedure to assemble the rotor assembly 20 of the dynamic pressure bearing motor having the structure described above will be described. First, as shown in FIG. 2, the rotary shaft 21 is fixed to the rotary hub 22 through press fit; the dynamic pressure bearing sleeve 13 with the cover member 13a mounted as in FIG. 3 is inserted through onto the rotary shaft 21 fixed to the rotary hub 22 and mounted as shown in FIG. 4. Next, the circular ring-shaped member 25 shown in FIG. 5 is inserted through on the outer circumference side of the dynamic pressure bearing sleeve 13, and the hub mounting section 25a of the circular ring-shaped member 25 is mounted along the fixing section 22e of the rotary hub 22. Next, the fixing section 22e is plastically deformed through caulking to fix the hub mounting section 25a of the circular ring-shaped member 25 to the rotary hub 22. The coating sealer 22g is coated to cover the fixing section 22e, which is plastically deformed through caulking, of the rotary hub 22.

This concludes a detailed description of the present invention by the inventors based on an embodiment, but the present invention is not limited to the embodiment and many modifications can be made without departing from the subject matter of the present invention.

For example, although the circular ring-shaped member 25 is fixed in place through plastic deformation such as caulking of the fixing section 22e according to the present embodiment, the fixing means is not limited to this and any one of appropriate methods can be applied. For example, laser welding may be used instead. If laser welding is used to join members, contamination phenomenon can occur in the vicinity of the joining section as a result of metal evaporation, but such adverse effects can be prevented by covering the joining section with an adhesive.

Further, instead of providing the fixing section 22e, a circumferential wall section 22f formed also to serve as the fixing section 22e can be caulked, and the caulked part can be sealed with the coating sealer 22g.

Next, referring to FIG. 8, a dynamic pressure bearing motor in accordance with another embodiment of the present invention will be described. According to this embodiment, wear on a hub can be controlled and the life of a dynamic pressure bearing extended, even when the hub and the dynamic pressure bearing member come into contact in start and stop operations. Parts that are substantially identical to parts in the dynamic pressure bearing motor shown in FIG. 1 are assigned the same numbers and their detailed description is omitted.

Figure 8:
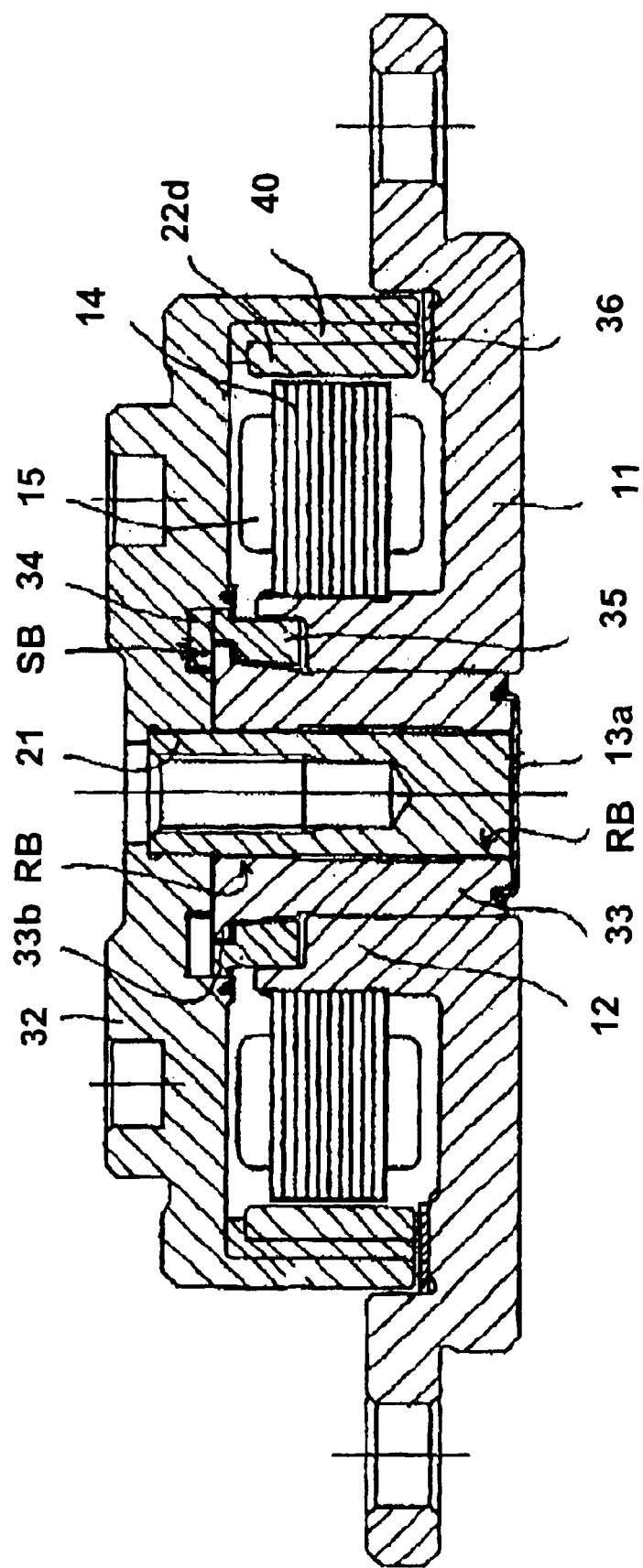
FIG. 8 is a cross-sectional view of a dynamic pressure bearing motor in accordance with another embodiment of the present invention.

In FIG. 8, a rotary shaft 21 is fitted into a dynamic pressure bearing sleeve 33. A rotary hub 32 is joined onto a part of the rotary shaft 21 that protrudes from the top end of the dynamic pressure bearing sleeve 33 through press fit. The rotary hub 32 is made of an aluminum material, such as aluminum alloy.

The dynamic pressure bearing sleeve 33 includes a cylindrical section that serves to form radial dynamic pressure bearing sections RB, RB, and an expanded diameter section 33b that is formed on the outer circumference side of the cylindrical section and that serves to form a thrust dynamic pressure bearing section SB. A ring-shaped thrust plate 34 is embedded in the back surface, i.e., a ceiling section, of the rotary hub 32. The ceiling surface of the rotary hub 32 is opposite the top end surface of the dynamic pressure bearing sleeve 33 across a minuscule gap, while approximately half of the bottom surface of the thrust plate 34 on the inner side in the radial direction is opposite the top surface of the expanded diameter section 33b of the dynamic pressure bearing sleeve 33 across a minuscule gap. On the top surface of the expanded diameter section 33b of the dynamic pressure bearing sleeve 33 are formed spiral grooves that generate dynamic pressure force in the thrust direction, and the thrust dynamic pressure bearing section SB is formed between the expanded diameter section 33b and the thrust plate 34. A lubricating oil that serves as a lubricating fluid is present in an area in which the dynamic pressure bearing sleeve 34 and the rotary hub 32 are opposite each other, as well as in the thrust dynamic pressure bearing section SB. The thrust plate 34 may preferably be made of an iron material.

Approximately half of the bottom surface of the thrust plate 34 on the outer side in the radial direction is joined with a circular ring-shaped member 35 that serves as a fallout stopper. The circular ring-shaped member 35 corresponds to the circular ring-shaped member that serves as a fallout stopper member in the embodiment shown in FIG. 1, and consists of a large diameter section in the top end section and a small diameter section in other areas; the rotary hub 32 is caulked in the vicinity of an outer circumference flange section between the large diameter section and the small diameter section, which causes the circular ring-shaped member 35 to be fixed to the rotary hub 32 while at the same time being joined to the thrust plate 34. A step section is formed on the inner circumference side of the circular ring-shaped member 35 between the large diameter section and the small diameter section, and the step section is opposite the bottom surface of the expanded diameter section 33b across a minuscule gap. By having the expanded diameter section 33b of the dynamic pressure bearing sleeve 33 interposed between the rotary hub 32 and the circular ring-shaped member 35, which together substantially form a unitary structure, across minuscule gaps, the rotary shaft 21 that forms a unitary structure with the rotary hub 32 is prevented from falling out of the dynamic pressure bearing sleeve 33.

On the inner circumference surface of the cylindrical section of the dynamic pressure bearing sleeve 33 are formed radial dynamic pressure generating grooves near both ends in the axial direction to form the radial dynamic pressure bearing sections RB, RB. The thrust dynamic pressure generating grooves that make up the thrust dynamic pressure bearing section SB are formed along the entire circumference on the top surface of the expanded diameter section 33b.

Between the inner circumference surface of the circular ring-shaped member 35 and the outer circumference surface of the dynamic pressure bearing sleeve 33 that oppose each other, there is provided a capillary sealing section whose dimension gradually enlarges towards the bottom, as in the embodiment shown in FIG. 1. The capillary sealing section is formed by a tapered section, in which the space between the outer circumference surface of the dynamic pressure bearing sleeve 33, which is a dynamic pressure bearing member, and the inner circumference surface of the opposing circular ring-shaped member 35 gradually enlarges towards the outside in the axial direction (towards the bottom in FIG. 8). The capillary sealing section is provided on the outer side in the axial direction than the thrust dynamic pressure bearing section and prevents the lubricating oil from flowing out. During manufacture, the lubricating oil is filled in the gap through the capillary sealing section, and the liquid level of the lubricating oil is set to be at the capillary sealing section.

As shown in FIG. 8, a ring-shaped magnetic plate 36 is fixed onto a fixed frame 11 to oppose the bottom end surface of a drive magnet 22d. The magnetic plate 36 is positioned opposite the bottom end surface of the drive magnet 22d across an appropriate distance, and magnetic attractive force is generated in the thrust direction between the magnetic plate 36 and the drive magnet 22d. The magnetic attractive force is in the opposite direction to the dynamic pressure force in the thrust direction that is generated in the thrust dynamic pressure bearing section SB caused by the rotation of the rotary hub 32. The balance between the force in the thrust direction generated in the thrust dynamic pressure bearing section SB as a result of the rotation of the rotary hub 32 and the magnetic attractive force in the thrust direction causes the position of the rotary hub 32 in the axial direction to be maintained with high precision.

According to the embodiment in FIG. 8, the material of the rotary hub 32, which is a rotating member, is an aluminum material. If, as in the past, a thrust dynamic pressure bearing is formed directly on the rotary hub 32, the rotary hub 32 would come into contact with the dynamic pressure bearing sleeve 33 in start and stop operations and experience considerable wear. However, in accordance with the present embodiment, due to the fact that the thrust plate 34 made of an iron material is embedded in the rotary hub 32 and that the thrust dynamic pressure bearing section SB is formed in a region where the thrust plate 34 and the expanded diameter section 33b of the dynamic pressure bearing sleeve 33 oppose each other in the axial direction, as well as to the fact that the thrust plate 34 has high abrasion resistance, wear on the rotary hub 32 can be prevented and the life of the fluid dynamic pressure bearing motor extended even if the dynamic pressure bearing sleeve 33 and the thrust plate 34 were to come into contact in start and stop operations.

Furthermore, due to the fact that the thrust plate 34 is interposed between the expanded diameter section 33b of the dynamic pressure bearing sleeve 33 and the rotary hub 32, the thrust plate 34 would not fall out. There is a difference in the thermal expansion coefficient of the thrust plate 34 made of an iron material and that of the rotary hub 32 made of an aluminum material. As a result, simply joining the thrust plate 34 to the rotary hub 32 entails a risk that the thrust plate 34 may come off due to temperature changes. However, in the structure in which the thrust plate 34 is interposed between the dynamic pressure bearing sleeve 33 and the rotary hub 32, as described above, the thrust plate 34 can be prevented from coming off from the hub 32 due to temperature changes.

Figure 9:
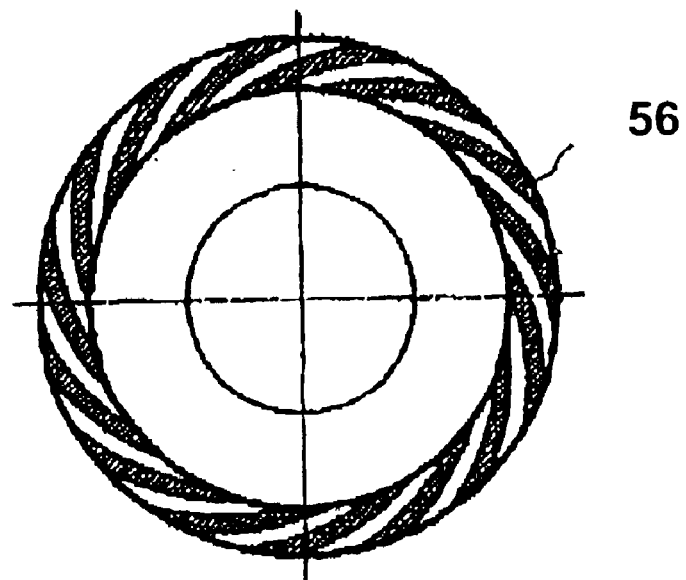
FIGS. 9(*a*) and 9(*b*) show examples of dynamic pressure generating grooves that are provided on the dynamic pressure bearing sleeve that can be used on the dynamic pressure bearing motors shown in FIG. 8, wherein FIG. 9(*a*) is a plan view, and FIG. 9(*b*) is a longitudinal cross-sectional view.
Figure 9:
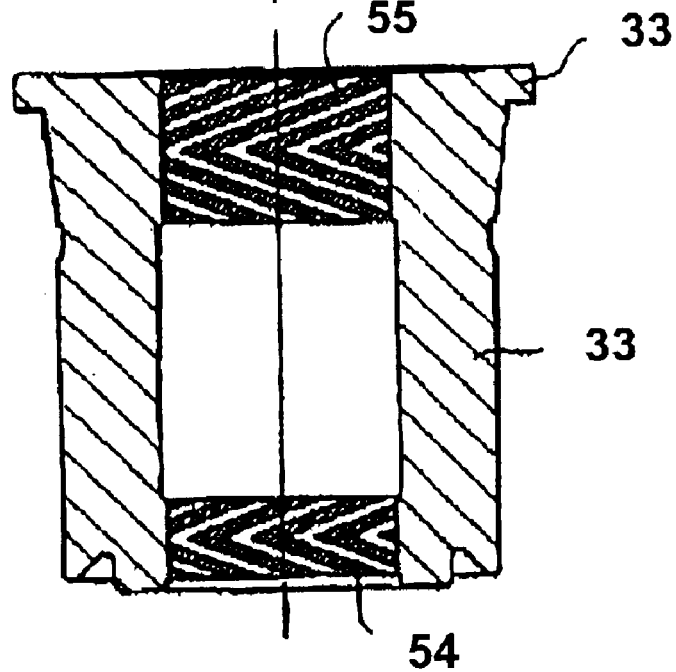

FIG. 9 shows examples of dynamic pressure generating grooves that make up the radial dynamic pressure bearing sections RB and the thrust dynamic pressure bearing section SB. As shown in FIGS. 9(a) and 9(b), spiral grooves 56 that make up the thrust dynamic pressure bearing section SB are formed on the top surface of the expanded diameter section 33b of the dynamic pressure bearing sleeve 33. Herringbone-shaped dynamic pressure generating grooves 54 and 55 that make up the radial dynamic pressure bearing sections RB are formed on the inner circumference surface at both ends in the axial direction of the dynamic pressure bearing sleeve 33. Both grooves are formed along the entire circumference of the dynamic pressure bearing sleeve 33.

According to the present embodiment, the spiral grooves 56 that make up the thrust dynamic pressure bearing section SB are provided to communicate to the outer circumference side and the inner circumference side of the dynamic pressure bearing sleeve 33, but the spiral grooves 56 may be provided not to communicate to the inner circumference side and instead communicate only to a certain point.

Figure 10:
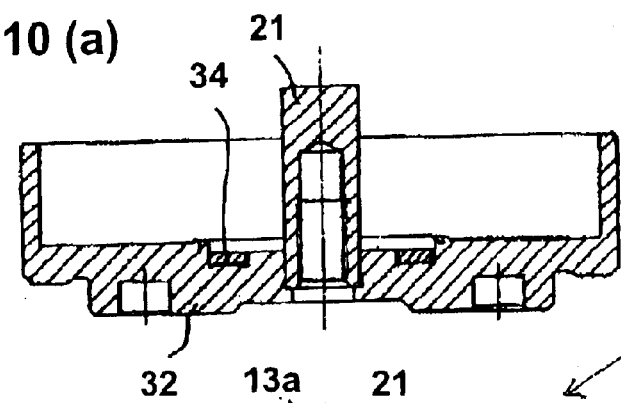
FIGS. 10(*a*)–10(*f*) show in cross section assembly steps for the dynamic pressure bearing motor shown in FIG. 8.
Figure 10:
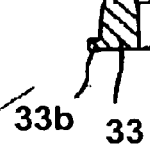
Figure 10:
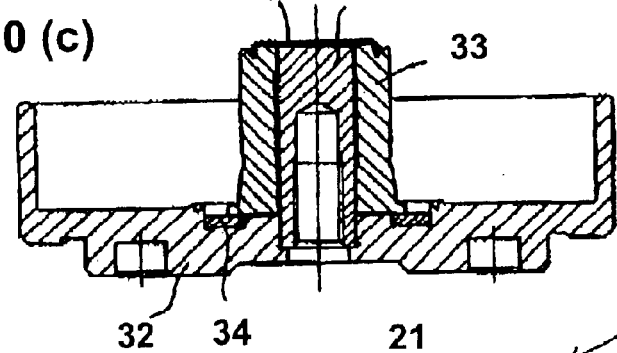
Figure 10:
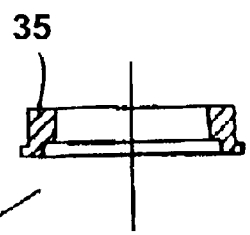
Figure 10:
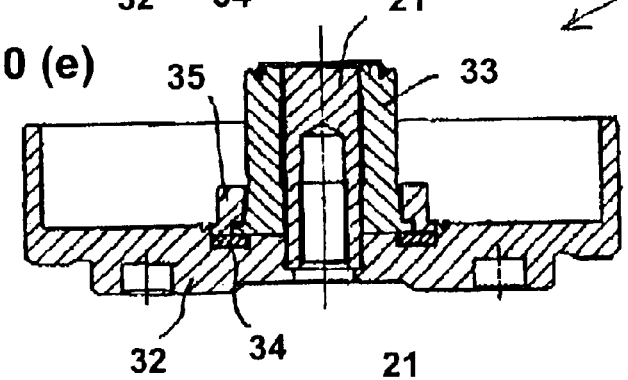
Figure 10:
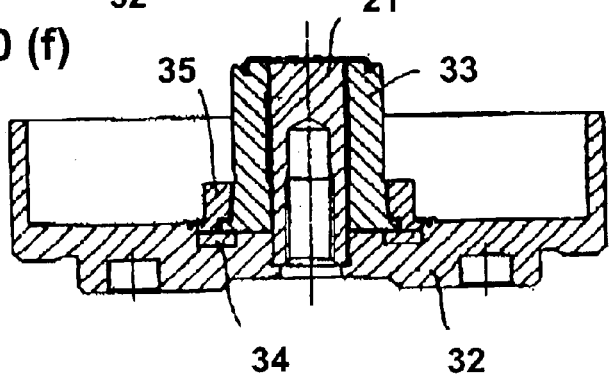
Figure 11:
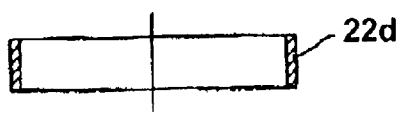
FIGS. 11(*f*)–11(*l*) shows in cross section assembly steps following the assembly steps shown in FIGS. 10(*a*)–10(*f*), wherein FIG. 11(*f*) is an inverted figure of FIG. 10(*f*).
Figure 11:
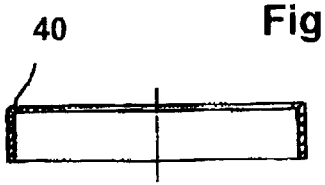
Figure 11:
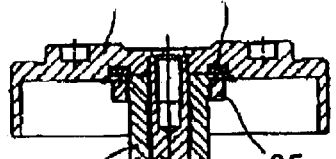
Figure 11:
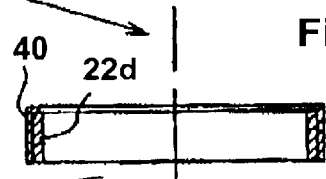
Figure 11:
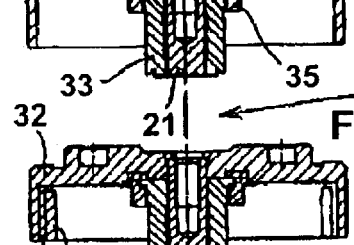
Figure 11:
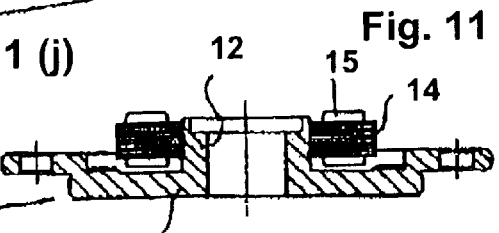
Figure 11:
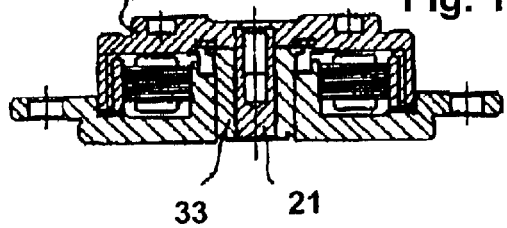

An assembly procedure for the fluid dynamic pressure bearing motor according to the present embodiment will be described with reference to FIGS. 10 and 11. FIG. 10(a) indicates a state in which the rotary shaft 21, the rotary hub 32 which is the rotating member, and the thrust plate 34 form a unitary structure that is vertically inverted. FIG. 10 (b) indicates the dynamic pressure bearing sleeve 33 whose one end is closed off by a cover 13a and vertically inverted. As indicated in FIG. 10(c), the dynamic pressure bearing sleeve 33 is inserted on the outer circumference side of the rotary shaft 21. Next, the circular ring-shaped member 35 shown in FIG. 10(d) is inserted on the outer circumference side of the dynamic pressure bearing sleeve 33 as shown in FIG. 10(e), such that an end surface of the circular ring-shaped member 35 is joined to approximately half of the thrust plate 34 on the outer circumference side. Next, the rotary hub 32 is caulked, so that the ring-shaped member 35 and the rotary hub 32 form a unitary structure, as shown in FIG. 10(f). The caulked sections and joining sections of the rotary hub 32 and the circular ring-shaped member 35 are sealed with resin to prevent the lubricating oil from flowing out. The lubricating oil is injected into the capillary sealing section formed between the inner circumference surface of the circular ring-shaped member 35 and the outer circumference surface of the dynamic pressure bearing sleeve 33 in the posture shown in FIG. 10(f), which completes a bearing assembly.

Next, the drive magnet 22d shown in FIG. 11(g) is inserted along the inner circumference surface of a back yoke 40 shown in FIG. 11(h), and the drive magnet 22d and the back yoke 40 are fixed to each other as shown in FIG. 11(i). The bearing assembly shown in FIG. 10(f) is inverted to its proper posture, i.e., a posture in which the dynamic pressure bearing sleeve 33 and the rotary shaft 21 extend downward from the rotary hub 32, as shown in FIG. 11(f); in this posture, the back yoke 40 with the drive magnet 22d fixed to it is inserted into and fixed to the inner circumference surface of the circumferential wall of the rotary hub 32, as shown in FIG. 11(j).

As shown in FIG. 11(k), a stator, which consists of a drive coil 15 wound around each salient pole of a core 14 in advance, is fixed to the fixed frame 11, and this makes up a stator/base section assembly. The dynamic pressure bearing sleeve 33 of a bearing/rotor assembly shown in FIG. 11(j) is inserted into the inner circumference side of the bearing holder 12, which is a cylindrical section of the fixed frame 11 that makes up the stator/base section assembly, and fixed through an appropriate fixing means such as press fit; this completes a fluid dynamic pressure bearing motor shown in FIG. 11(l).

Figure 12:
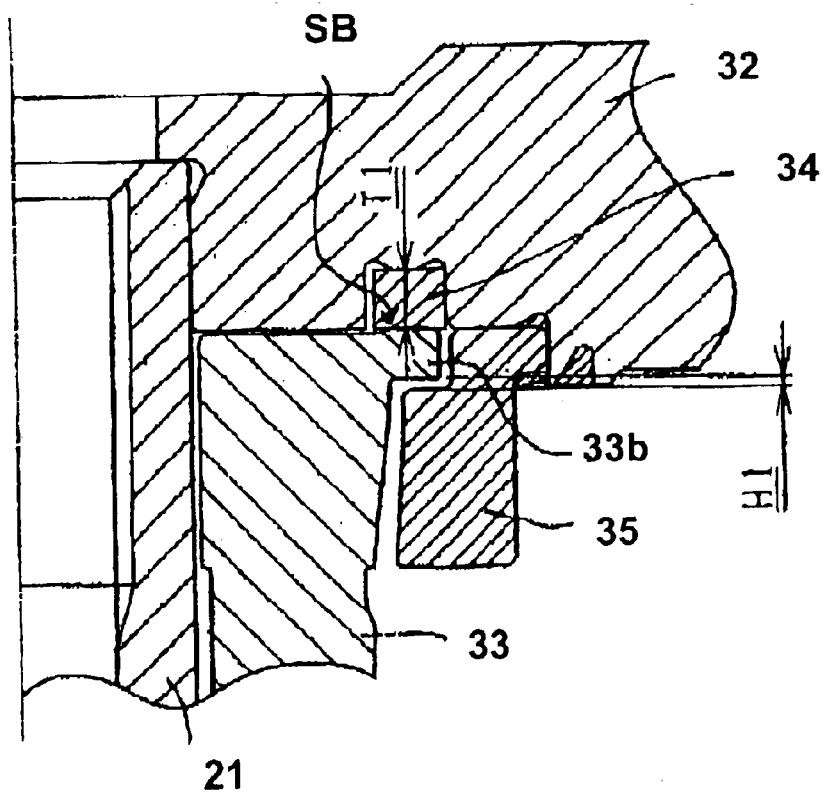
FIGS. 12(*a*) and 12(*b*) are cross-sectional views of parts of the dynamic pressure bearing motor shown in FIG. 8 in another embodiment, which show different thickness dimensions of the thrust plate.
Figure 12:
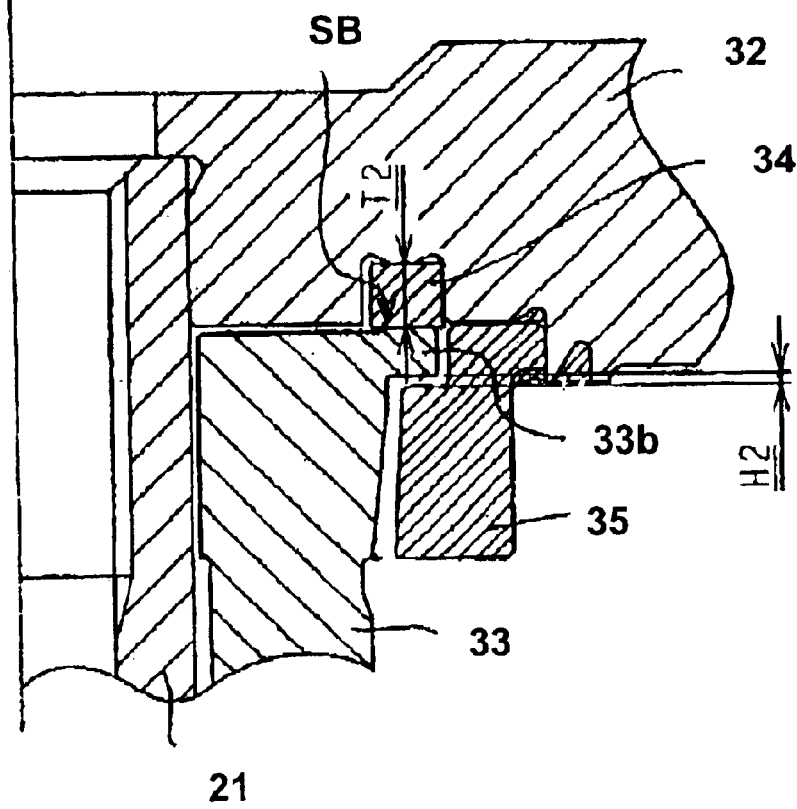

According to the present embodiment described above, the circular ring-shaped member 35 is joined to the thrust plate 34, which is fixed to the rotary hub 32. However, in another modified example, the circular ring-shaped member 35 can be directly joined to the rotary hub 32 and thereby have a fallout stopper function, as shown in FIG. 12, where the top end surface of the circular ring-shaped member 35 is directly joined to the rotary hub 32.

According to this example, due to the fact that fluctuations in the thickness dimension of a thrust plate 34 lead to fluctuations in the gap dimension in the thrust direction, the thickness dimension of the thrust plate 34 must be accurate. FIGS. 12(a) and 12(b) indicate cases where the thrust plate 34 has fluctuations in the thickness dimension. FIG. 12(a) indicates a case in which the thickness dimension of the thrust plate 34 is T1, while FIG. 12(b) indicates a case in which the thickness dimension of the thrust plate 34 is T2, where T1<T2. When the thickness dimension of the thrust plate 34 is T1, the gap dimension in the thrust direction between a flange section of an expanded diameter section 33b of a dynamic pressure bearing sleeve 33 and a step section of the circular ring-shaped member 35 is H1, while the gap dimension in the thrust direction is H2 when the thickness dimension of the thrust plate 34 is T2, where H1>H2, which results in large fluctuations in the gap dimension H in the thrust direction.

Figure 13:
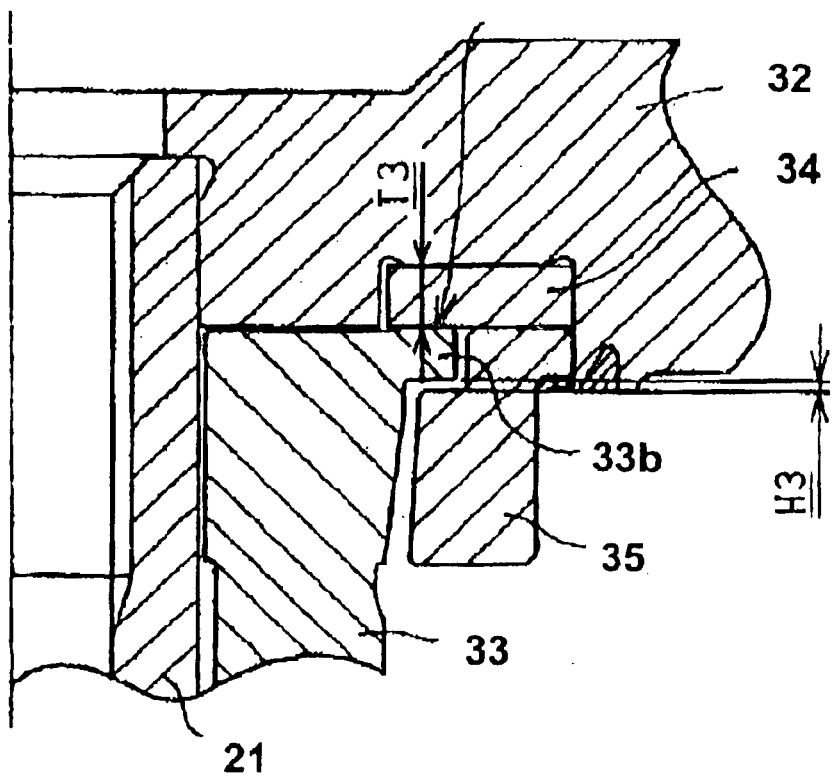
FIGS. 13(*a*) and 13(*b*) show cross-sectional views of parts of the fluid dynamic pressure bearing motor shown in FIG. 8 in another embodiment, which show different thickness dimensions of the thrust plate.
Figure 13:
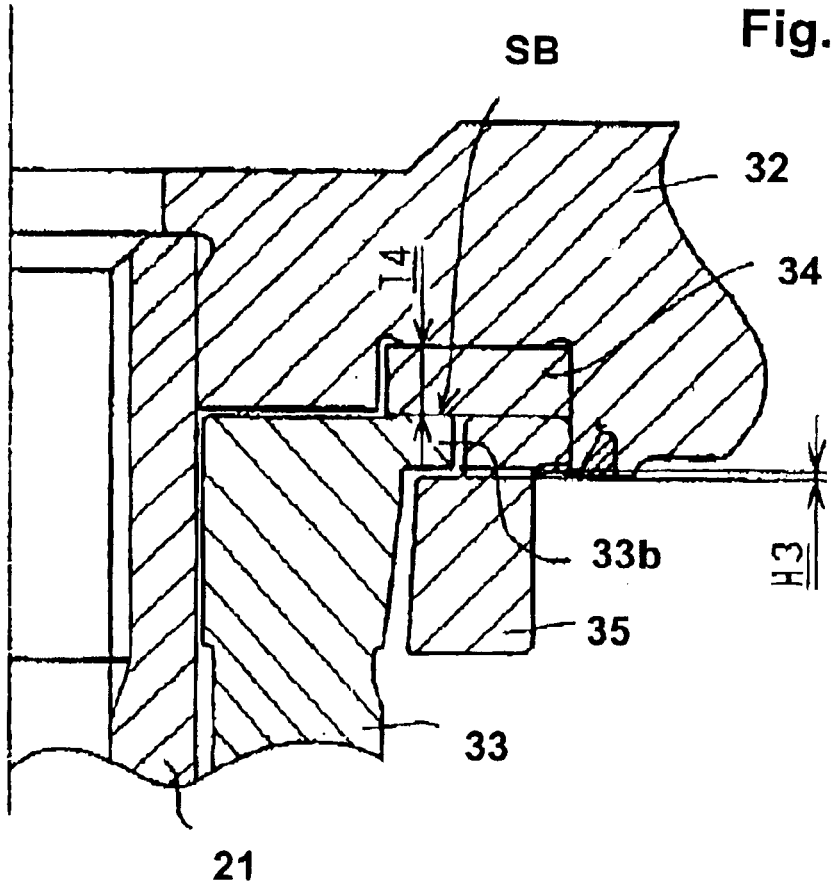

However, according to the embodiment described and shown in FIGS. 8 through 11, even if the thickness dimension of the thrust plate 34 were to fluctuate, there would be no fluctuations in the gap dimension H in the thrust direction between the flange section of the expanded diameter section 33b of the dynamic pressure bearing sleeve 33 and the step section of the circular ring-shaped member 35. FIGS. 13(a) and 13(b) describe the reason for this. FIG. 13(a) indicates a case in which the thickness dimension of the thrust plate 34 is T3, while FIG. 13(b) indicates a case in which the thickness dimension of the thrust plate 34 is T4, where T3<T4. On the bottom surface of approximately half of the thrust plate 34 on the outer side in the radial direction is fixed the top end surface of the circular ring-shaped member 35, while the circular ring-shaped member 35 is fixed to the rotary hub 32. The thrust dynamic pressure bearing section SB is formed between the expanded diameter section 33b of the dynamic pressure bearing sleeve 33 and the bottom surface of approximately half of the thrust plate 34 on the inner side in the radial direction, and the gap between the two members is maintained at a constant by the dynamic pressure force of the thrust dynamic pressure bearing section SB. Consequently, the reference position of the gap in the thrust direction of the thrust dynamic pressure bearing section SB part and the reference position in the thrust direction of the circular ring-shaped member 35 are both on the bottom surface of the thrust plate 34, which causes the gap dimension in the thrust direction between the flange section of the expanded diameter section 33b of the dynamic pressure bearing sleeve 33 and the step section of the circular ring-shaped member 35 to be H3 for both cases shown in FIGS. 13(a) and 13(b).

If the gap in the thrust direction were to be wider, vibrations or impacts can cause such failures as a magnetic disk mounted on the hub coming into contact with a ramp loading section of a magnetic head. On the other hand, if the gap in the thrust direction were to be narrower, torque loss would increase, which would increase drive current value, and the flange section of the expanded diameter section 33b and the step section of the circular ring-shaped member 35 would come into contact. However, by using structures indicated in FIGS. 8 and 13, the dynamic pressure force in the thrust direction stabilizes, which eliminates failures caused by fluctuations in the dynamic pressure force.

Figure 14:
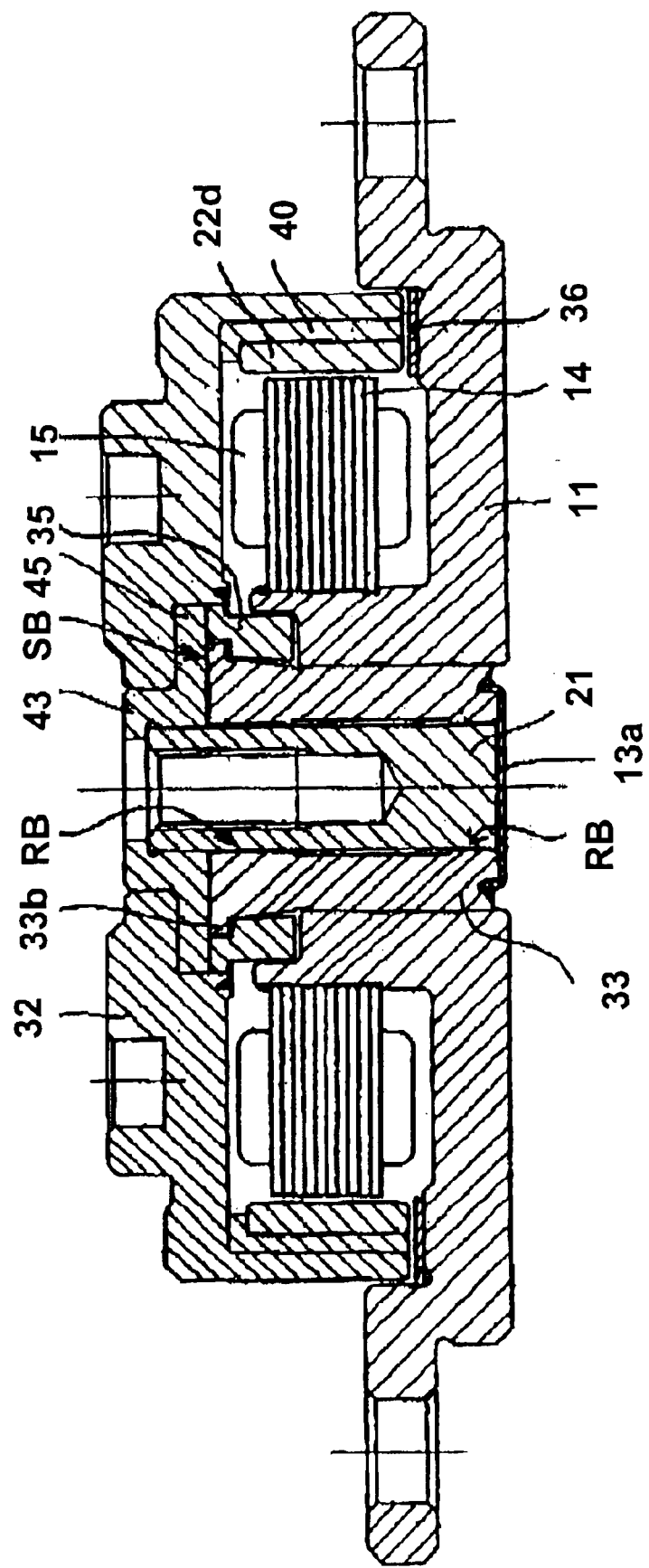
FIG. 14 is a cross-sectional view of a dynamic pressure bearing motor in accordance with yet another embodiment of the present invention.

Next, referring to FIG. 14, another embodiment will be described with emphasis on parts that are different from previous embodiments. The part of the embodiment in FIG. 14 that differs from the previous embodiments is the shape or structure of the thrust plate. In FIG. 14, 43 indicates a thrust plate, and the thrust plate 43 comprises a cylindrical section and a flange section 45, in which the outer diameter of one end section in the axial direction of the thrust plate 43 is expanded. A rotary shaft 21 is fitted in a unitary fashion on the inner circumference side of the cylindrical section of the thrust plate 43, and a rotary hub 32, on which is mounted a disk, is fitted in a unitary fashion on the outer circumference side of the flange section 45. The bottom surface of the flange section 45 is opposite the top end surface of a dynamic pressure bearing sleeve 33 across a minuscule gap, while the bottom surface of the flange section 45 that projects more outward to the outer circumference side than the top end surface of the dynamic pressure bearing sleeve 33 is joined with the top end surface of a circular ring-shaped member 35. On the top surface of an expanded diameter section 33b of the dynamic pressure bearing sleeve 33 are formed spiral grooves that generate dynamic pressure force in the thrust direction, and a thrust dynamic pressure bearing section SB is formed between the bottom surface of the flange section 45 of the thrust plate 43 and the expanded diameter section 33b of the dynamic pressure bearing sleeve 33. The rotary hub 32 is made of an aluminum material, while the thrust plate 43 is made of an iron material.

According to the embodiment shown in FIG. 14, due to the fact that the thrust plate 43 made of an iron material is placed between the rotary shaft 21 and the rotary hub 32, the bonding strength between the rotary shaft 21 and the thrust plate 43 can be enhanced. At the same time, because the thrust plate 43 is bonded with the rotary hub 32 on the outer circumference side, the larger bonding area enhances the bonding strength between the thrust plate 43 and the rotary hub 32. As a result, the bonding strength between the rotary shaft 21 and the rotary hub 32 is enhanced.

Conventionally, there are motors in which an iron ring is placed between a hub made of an aluminum material and a rotary shaft in order to enhance the bonding strength between the hub and the rotary shaft. In the embodiment shown in FIG. 14, the thrust plate 43 composes and serves also as an iron ring. Furthermore, there is an advantage in the present invention in that the thrust plate 43 and the iron ring can be formed as a single member.

Although all of the embodiments shown in the drawings are outer rotor-type motors, the present invention can be applied also to inner rotor-type motors.

The present invention can be applied not only to oil dynamic pressure motors that use a lubricating oil as a dynamic pressure generating fluid, but also to pneumatic dynamic pressure motors that use air as the dynamic pressure generating fluid. Dynamic pressure bearing motors according to the present invention can be used as disk drive motors and also as drive motors for various rotating bodies. For example, the present invention is applicable to disk drive motors for magnetic disks and optical disks, as well as drive motors for various apparatuses that require high rotational precision.

As described above, in a dynamic pressure bearing motor according to the present invention, a hub mounting section of a circular ring-shaped member, which serves as a fallout stopper member, is positioned on the outer circumference side of a fallout stopper flange section provided on a dynamic pressure bearing sleeve. As a result, the height in the axial direction of a stator core holding section of a holder member can be extended to reach the hub mounting section of the circular ring-shaped member, and thus sufficient joining force can be obtained for the stator core, and the magnetic vibration of the stator core that occurs when the dynamic pressure bearing motor is made thinner can be favorably controlled. Consequently, the dynamic pressure bearing motor can be made favorably thinner through a simple structure without any decline in the property or reliability of the dynamic pressure bearing motor.

In the dynamic pressure bearing motor according to the present invention, especially due to the fact that the height in the axial direction of the stator core holding section of the holding member can be formed to a height equal to or greater than the height in the axial direction of the stator core held by the holder member, sufficient joining force can be obtained for the stator core. Furthermore, because the circular ring-shaped member that serves as a fallout stopper member can be firmly fixed, the reliability of the dynamic pressure bearing motor can be enhanced.

In addition, in accordance with to the present invention, a rotating member that is rotatively driven in a unitary fashion with a rotary shaft includes a hub formed with an aluminum material and a thrust plate that is provided in the hub and formed with an iron material, and a thrust dynamic pressure bearing is formed between the thrust plate and the dynamic pressure bearing member. As a result, wear on the hub is controlled and the life of the dynamic pressure bearing is extended even when the hub and the dynamic pressure bearing member come into contact in start and stop operations.

Moreover, in the present invention, the circular ring-shaped member abuts against the thrust plate, the gap in the thrust direction stabilizes, which reduces fluctuations in dynamic pressure force in the thrust direction.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A dynamic pressure bearing motor comprising:
   a rotary shaft;
   a rotary hub coupled to the rotary shaft;
   a dynamic pressure bearing sleeve for supporting the rotary shaft by dynamic pressure, the dynamic pressure bearing sleeve having a fallout stopper flange section that protrudes outward in the radial direction;

a thrust dynamic pressure bearing section formed in an axial direction between the dynamic pressure bearing sleeve and the rotary hub; and a circular ring-shaped member that surrounds an outer circumference surface of the dynamic pressure bearing sleeve, the circular ring-shaped member having a hub mounting section that connects to an end surface of the rotary hub in a region radially outside the thrust dynamic pressure bearing section, and a main body section that protrudes inward from the hub mounting section;

wherein an inner circumference surface of the hub mounting section of the circular ring-shaped member opposes in the radial direction an outer circumference surface of the fallout stopper flange section of the dynamic pressure bearing sleeve, and the main body section of the circular ring-shaped member opposes in the axial direction the fallout stopper flange section of the dynamic pressure bearing sleeve to prevent the dynamic pressure bearing sleeve from falling out in the axial direction.

2. A dynamic pressure bearing motor according to claim 1, wherein the rotary hub defines a generally leveled surface that forms a part of the thrust dynamic pressure bearing section, and the hub mounting section of the circular ring-shaped member is fixed to the generally level surface of the rotary hub.

3. A dynamic pressure bearing motor according to claim 1, wherein the rotary hub defines a generally leveled surface, the dynamic pressure bearing sleeve has an end surface that opposes in the axial direction the generally leveled surface of the rotary hub, and the hub mounting section of the circular ring-shaped member is fixed to the generally leveled surface of the rotary hub.

4. A dynamic pressure bearing motor according to claim 3, wherein the generally leveled surface forms a part of the thrust dynamic pressure bearing section.

5. A dynamic pressure bearing motor according to claim 3, wherein the generally leveled surface of the rotary hub includes a thrust plate, and the end surface of the dynamic pressure bearing sleeve and the hub mounting section of the circular ring-shaped member abut against the thrust plate.

6. A dynamic pressure bearing motor according to claim 1, wherein the rotary hub defines a recessed section and includes a thrust plate embedded in the recessed section wherein the thrust plate defines a generally leveled surface, the dynamic pressure bearing sleeve has an end surface that opposes in the axial direction the generally leveled surface of the thrust plate, and the hub mounting section of the circular ring-shaped member abuts against the generally leveled surface of the thrust plate.

7. A dynamic pressure bearing motor according to claim 6, wherein the circular ring-shaped member retains the thrust plate in the recessed section of the rotary hub to prevent the thrust plate from falling from the recessed section.

8. A dynamic pressure bearing motor according to claim 1, further comprising a fluid sealing section formed between an inner circumference surface of the main body section of the circular ring-shaped member and an outer circumference surface of the dynamic pressure bearing sleeve, wherein the fluid sealing section is defined by a gap in the radial direction that is continuous with the thrust dynamic pressure bearing section and prevents a lubricating fluid inside the thrust dynamic pressure bearing section from flowing outside.

9. A dynamic pressure bearing motor according to claim 8, wherein the fluid sealing section has an opening and a capillary sealing structure with a gap dimension that gradually enlarges towards the opening of the fluid sealing section.

10. A dynamic pressure bearing motor according to claim 9, wherein each of the outer circumference surface of the dynamic pressure bearing sleeve and the inner circumference surface of the main body section of the circular ring-shaped member, which together form the fluid sealing section, has a tapered surface that slopes inward in the radial direction towards the opening of the fluid sealing section, such that a center axial line of the fluid sealing section slopes inward in the radial direction towards the opening.

11. A dynamic pressure bearing motor according to claim 1, further comprising a stator core and a cylindrical holder member defining a central cylindrical hole that receives the rotary shaft and an outer circumferential wall that retains the stator core, wherein the outer circumferential wall of the holder member and the stator core have generally an equal height in the axial direction.

12. A dynamic pressure bearing motor according to claim 1, wherein the rotary hub includes a fixing section that fixes the hub mounting section of the circular ring-shaped member through plastic deformation.

13. A dynamic pressure bearing motor according to claim 12, wherein the fixing section protrudes in the axial direction from an end surface in the axial direction of the rotary hub.

14. A dynamic pressure bearing motor according to claim 12, wherein the fixing section includes an inner circumference surface formed as a regulating surface that positions the hub mounting section of the circular ring-shaped member.

15. A dynamic pressure bearing motor according to claim 12, further comprising a coating sealer that seals the fixing section that has been plastically deformed.

16. A dynamic pressure bearing motor according to claim 15, wherein the rotary hub includes a circumferential wall section formed outer side in the radial direction of the fixing section, thereby defining a sealer collecting section between the circumferential wall section and the fixing section to collect the coating sealer.

17. A dynamic pressure bearing motor comprising:

a rotary shaft:

a dynamic pressure bearing member for supporting the rotary shaft by dynamic pressure, the dynamic pressure bearing member having a fallout stopper flange section that protrudes outward in the radial direction;

a rotary member that rotates with the rotary shaft in a unitary fashion;

a thrust dynamic pressure bearing section formed between the dynamic pressure bearing member and the rotary member;

a circular ring-shaped member having a mounting section that surrounds an outer circumference surface of the dynamic pressure bearing member and a main body section that protrudes radially inward from the mounting section and opposes in the axial direction the fallout stopper flange section to prevent the dynamic pressure bearing member from falling out in the axial direction; and a stator core holding section that opposes in the axial direction the mounting section of the circular ring-shaped member and oppose in the radial direction the main body section of the circular ring-shaped section.

18. A dynamic pressure bearing motor according to claim 17, wherein the mounting section is joined to an end surface of the rotary member in a region radially outer side of the thrust dynamic pressure bearing section, and an inner circumference surface of the mounting section of the circular ring-shaped member is positioned to oppose in the radial direction an outer circumference surface of the fallout stopper flange section of the dynamic pressure bearing member at an outer side in the radial direction with respect to the inner circumferential surface of the main body section of the circular ring-shaped member.

19. A dynamic pressure bearing motor according to claim 17, further comprising a cylindrical holder member defining a central cylindrical hole that receives the rotary shaft and an outer circumferential wall that retains the stator core, wherein the outer circumferential wall of the holder member and the stator core have generally an equal height in the axial direction.

20. A dynamic pressure bearing motor comprising:

a rotary shaft;

a rotating member that is rotatively driven in a unitary fashion with the rotary shaft, the rotating member including a rotary hub that is made of an aluminum material and a disk mounting section;

a dynamic pressure bearing member that rotatively supports the rotary shaft by dynamic pressure;

a thrust dynamic pressure bearing section provided in a region where an end surface in the axial direction of the dynamic pressure bearing member and an end surface in the axial direction of the rotating member oppose each other in the axial direction; and a thrust plate made of an iron material that is provided on the rotary hub and makes up a part of the thrust dynamic pressure bearing.

21. A dynamic pressure bearing motor according to claim 20, wherein the dynamic pressure bearing member includes an end section that expands outward in the radial direction to define an expanded diameter section, and the thrust dynamic pressure bearing section is formed in a region where an end surface on the expanded diameter section of the dynamic pressure bearing member and the thrust plate oppose each other in the axial direction.

22. A dynamic pressure bearing motor according to claim 21, wherein the expanded diameter section of the dynamic pressure bearing member is interposed between the circular ring-shaped member and the rotating member to prevent the dynamic pressure bearing member from falling out the rotating member, and vice versa.

23. A dynamic pressure bearing motor according to claim 22, wherein the circular ring-shaped member is positioned in the axial direction by abutting itself against the thrust plate provided on the rotating member.

24. A dynamic pressure bearing motor according to claim 20, wherein the rotary shaft is fitted in a unitary fashion on an inner circumference side of the thrust plate and the rotating member is mounted in a unitary fashion on an outer circumference side of the thrust plate.

25. A dynamic pressure bearing motor according to claim 20, wherein opposing surfaces in the radial direction of the rotary shaft and the dynamic pressure bearing member define at least one radial dynamic pressure bearing section, and a lubrication oil is filled in the radial dynamic pressure bearing section and the thrust dynamic pressure bearing section.

26. A dynamic pressure bearing motor according to claim 25, further comprising a taper section that is defined by an outer circumferential surface of the dynamic pressure bearing member and an opposing inner circumferential surface of the circular ring-shaped member, wherein the taper section has a near end side and a far end side located farther than the near end side in the axial direction from the thrust dynamic pressure bearing section, and defines a gap that gradually widens from the near end side toward the far end side in the axial direction, the taper section defining a capillary seal section that prevents the lubrication oil from flowing out from the thrust dynamic pressure bearing section.

* * * * *